UNITED STATES PATENT OFFICE.

PAUL HOMERO, OF TRIESTE, AUSTRIA-HUNGARY.

MEDICINAL TEA.

SPECIFICATION forming part of Letters Patent No. 333,632, dated January 5, 1886.

Application filed October 27, 1885. Serial No. 149,353. (No specimens.)

*To all whom it may concern:*

Be it known that I, PAUL HOMERO, a citizen of Austria-Hungary, residing at Trieste, Austria-Hungary, have discovered a Medicinal Tea, useful against all complaints of the throat and lungs, of which the following is a specification.

The composition consists of two plants, the first of which was not known to science prior to my discovery. The following is a description of both: first, *Polygonum aviculare* I, of the family of the *Polygona*, eighth class, (*Octandria*,) third order, (*Tryginia*,) having a short stalk, or rather bulb, of a reddish, dark-brown color, with numerous roots, more or less fibrous, many capillary; leaves small, simple, alternate, with a kind of sheath; blossoms androgynous with an only parianth, shut up in the sheath; stamens, eight; pistil with an only central and high ovary; fruit dry, almost pyramidal; monocotyledonous; second, *Lepidium ruderale*, family of the *Cruciferæ*, fifteenth class, system Linné; has only a four-leafed green calyx, no petals, and only two stamens. These ingredients are mixed in the following proportions: First, *Polygonum aviculare*, fifty-seven grams; second, *Lepidium ruderale*, three grams. Both plants are finely cut up, the *Polygonum aviculare* with the roots. Thirty grams of this mixture are slowly boiled with a liter of water in an earthen and well-closed pot, until the water takes a dark-yellow color. Of this decoction one-third is taken in the morning, one-third at noon, and one-third in the evening, an hour before or after meals. The *Polygonum aviculare* has a diuretic astringent effect. It is diaphoretic and facilitates the expectoration. The *Lepidium ruderale* has an anti-febrile effect.

This tea, introduced by me into most European countries, has proven to be a most effectual remedy against all complaints of the throat and lungs.

I am not aware that this composition was ever used either in Europe nor in the United States as a medicinal tea prior to my introducing the plants from Siberia.

What I claim, and desire to secure by Letters Patent, is—

The herein-described composition, consisting of *Polygonum aviculare* and *Lepidium ruderale*, to be used in the proportions above set forth, as a medicinal tea against all complaints of the throat and lungs.

PAUL HOMERO.

Witnesses:
 FELIX TIETZ,
 F. W. HOSSFELD.